United States Patent [19]

Florus et al.

[11] 4,044,634
[45] Aug. 30, 1977

[54] INSTALLATION FOR AUTOMATIC SHIFTING OF CHANGE-SPEED GEARS

[75] Inventors: Hans-Jörg Florus, Goppingen; Horst Grossner, Geradstetten; Günter Weiger, Zell, all of Germany

[73] Assignee: Daimler-Benz Aktiengesellschaft, Germany

[21] Appl. No.: 492,145

[22] Filed: July 26, 1974

[30] Foreign Application Priority Data

July 27, 1973 Germany .............................. 2338122

[51] Int. Cl.² ............................................. B60K 21/00
[52] U.S. Cl. ..................................................... 74/866
[58] Field of Search ............. 74/866, 859, 862, 752 D, 74/868, 864

[56] References Cited

U.S. PATENT DOCUMENTS

| | | | |
|---|---|---|---|
| 3,439,564 | 4/1969 | Scholl et al. | 74/866 |
| 3,665,779 | 5/1972 | Mori | 74/866 |
| 3,684,066 | 8/1972 | Kubo et al. | 74/866 X |
| 3,727,488 | 4/1973 | Wakamatsu et al. | 74/866 |
| 3,732,755 | 5/1973 | Beig et al. | 74/866 |
| 3,733,930 | 5/1973 | Mizote | 74/866 |
| 3,747,438 | 7/1973 | Toyoda et al. | 74/866 |
| 3,752,284 | 8/1973 | Brittain et al. | 192/103 F |

FOREIGN PATENT DOCUMENTS 2,036,732 2/1972 Germany .............................. 74/866

Primary Examiner—Samuel Scott
Assistant Examiner—Frank H. McKenzie, Jr.
Attorney, Agent, or Firm—Craig & Antonelli

[57] ABSTRACT

An installation for the automatic shifting of change-speed transmissions, especially for motor vehicles, in which actuating devices are provided for the engagement and disengagement of the speeds, which are controllable by way of control means by at least two influencing magnitudes, particularly output rotational speed and torque; an electronic control unit having a programmed, constant-value memory device is provided, in which is stored at least one set of output rotational speed limit values coordinated to the individual speeds and torque steps, while at least the influencing magnitudes of torque and engaged speed are adapted to be applied to the electronic control unit by way of corresponding inputs; and output of the constant value memory device is operatively connected with a rotational speed comparison unit, in which the output rotational speed limit values given out by the constant-value memory device are adapted to be compared with the prevailing output rotational speed, whereby in this rotational speed comparison unit shifting-up or shifting-down signals are adapted to be released, when exceeding or falling below the limit values; these shifting-up or shifting-down signals are then applied to the actuating devices.

64 Claims, 9 Drawing Figures

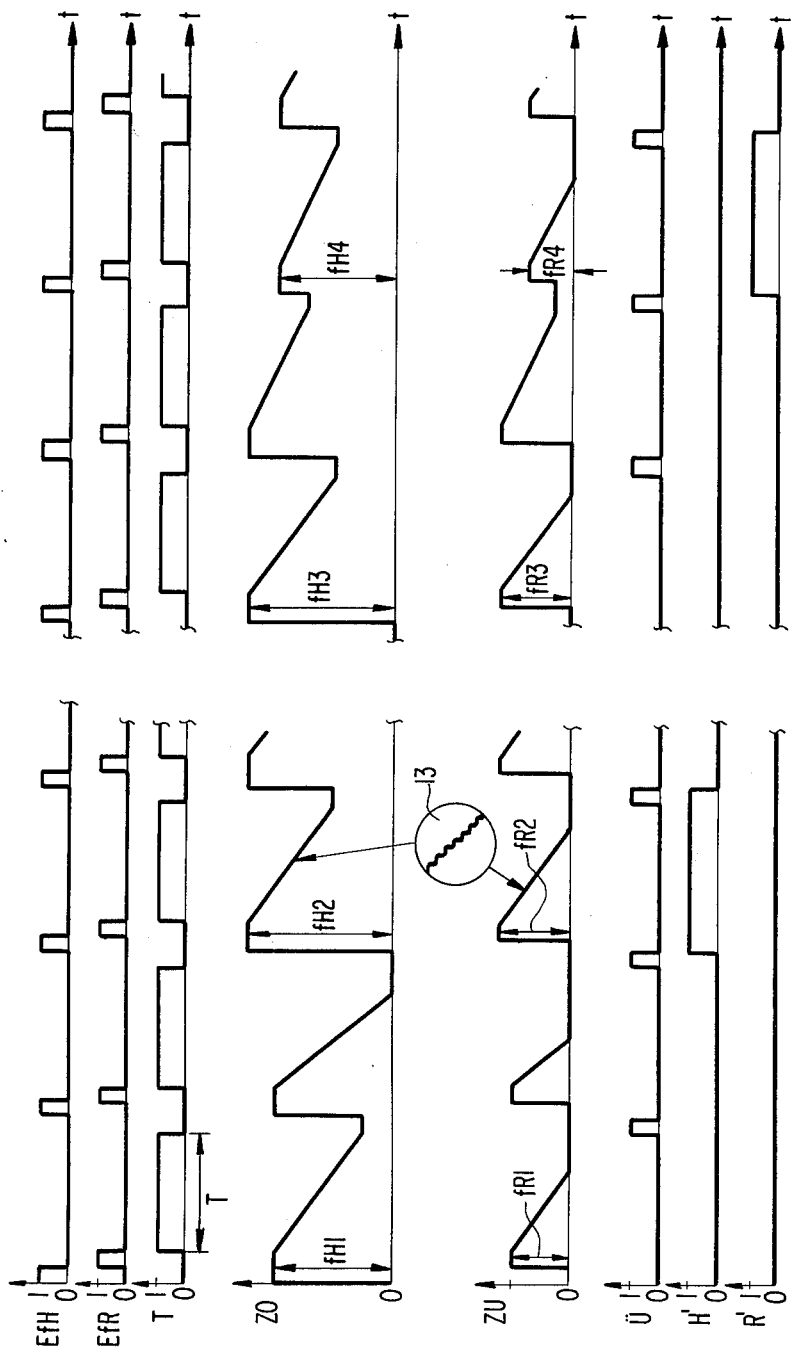

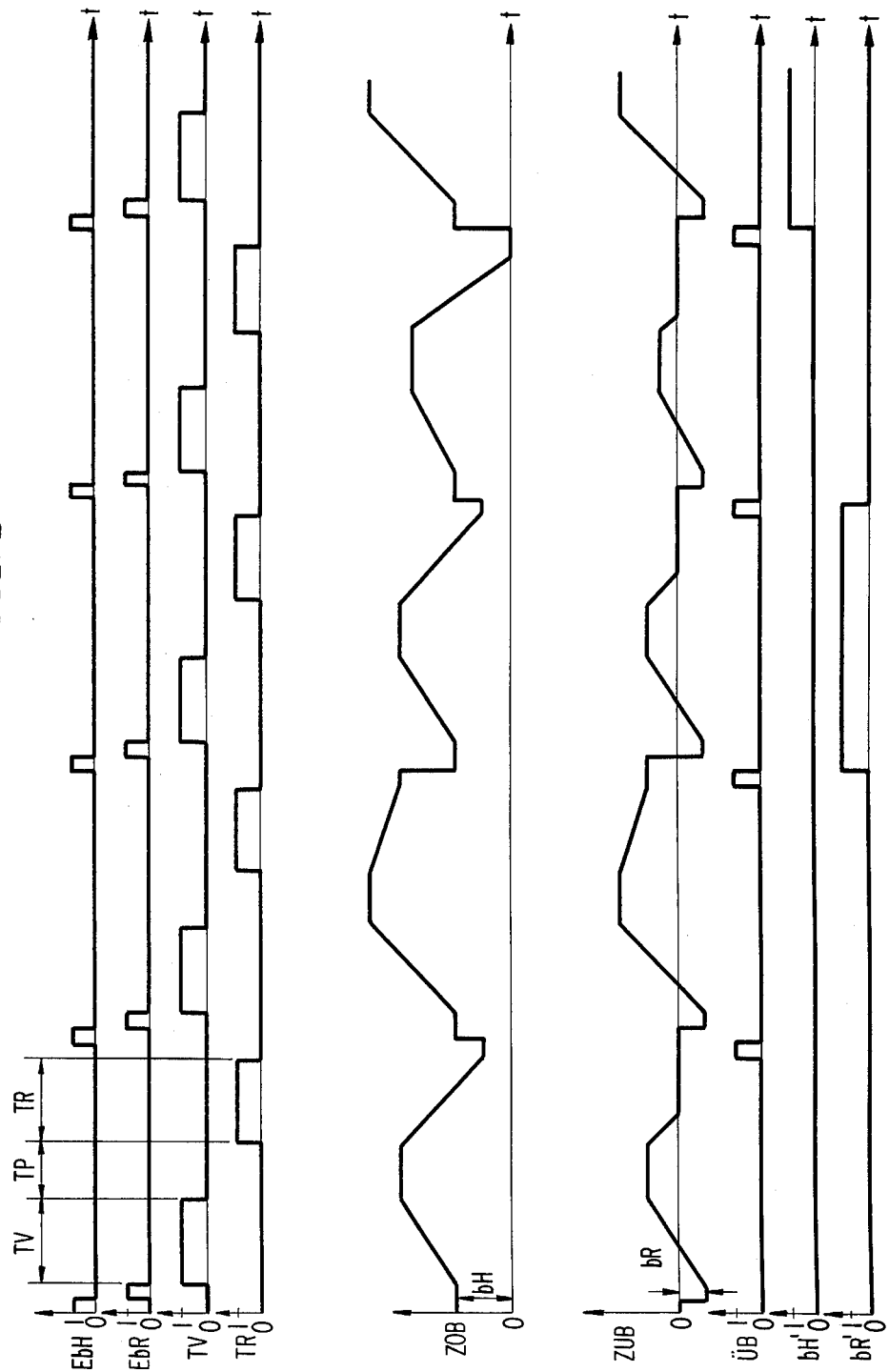

INSTALLATION FOR AUTOMATIC SHIFTING OF CHANGE-SPEED GEARS

The present invention relates to an installation for the automatic shifting of change-speed transmissions, especially in motor vehicles, whereby actuating devices are provided for the engagement and disengagement of the speeds, which are controllable by way of control means by at least two influencing magnitudes, especially by the output or driven rotational speed and the driving torque.

In manually shifted transmissions, the thresholds at which a shifting of the speed is to take place, is determined individually by the driven and is determined anew for each shifting operation. In automatic transmissions, these shifting thresholds are generally predetermined and fixed. This predetermination takes place by means of springs which, for example, are acted upon by pressures dependent on torque or forces of a centrifugal governor. The springs thereby acts as storage devices (memory devices) while the spring constants are the store contents (memory contents) and the positions of the springs determine the shifting commands. However, connected therewith is the disadvantage that the shifting thresholds can be changed only by structural alterations in the transmission and therefore only one driving program is possible for each transmission. An electronic shifting system is known which initiates a shifting operation at equality of driving (input) and driven (output) rotational speed of the transmission. However, this involves only an installation for determining the synchronization (German Offenlegungsschrift No. 2,036,732).

The present invention is concerned with the task to provide an autmotic shifting installation which avoids the disadvantages of manually shifted transmissions, especially high loads of the transmission by erroneous shifting, incorrect shifting speed, etc., which matches the shifting points in an optimum manner to the prevailing operating conditions and assures a more protective operation of the transmission as well as a better engine utilization than with the heretofore customary means and which also opens up the possibility to manufacture automatic transmissions with more than four speeds with acceptable expenditures.

The underlying problems are solved according to the present invention in that an electronic control unit with a constant storage device or memory of constants adapted to be programmed is provided, in which is stored at least one set of output (driven) rotational speed limit values coordinated to at least the individual speeds and torque steps, in that the influencing magnitudes of torque and engaged speed are adapted to be fed into the electronic control unit by way of corresponding inputs, and in that one output of the constant storage device or memory is connected with a rotational speed comparison unit, in which the driven rotational speed limit values produced by the constant store or memory are adapted to be compared with the prevailing driven (output) rotational speed and in that in this rotational speed comparison unit, shifting up or shifting down signals are adapted to be triggered when exceeding or falling below the limit values and are adapted to be fed to the actuating devices.

The characteristic shifting curves which are empirically determined, are thereby converted into digital signals, i.e., into stepped curves and the rotational speed values coordinated to the individual torque steps are once inscribed into the constant value store or memory. The constant storage or memory device may consist, for example, of integrated circuits of conventional type designated by ROM or PROM. The required influencing magnitudes are thereby fed to the electronic control unit and are converted by the same in a conventional manner to the address for purposes of controlling the constant storage or memory device.

The advantages of the installation according to the present invention are believed self-obvious. With the aid of several sets of rotational speed limit values, the characteristic shifting curves may be changed at will and may be optimally matched to different operating conditions such as runningin, driving in a fuel-saving manner, driving without load or fully loaded, etc. Also, the construction of an automatic transmission with many speeds can be realized readily since no hydraulic shifting plates with many slide valve members, etc., as necessitated heretofore, is required and the hydraulic system is limited to the actuation of the clutches and brakes which can be carried out by electromagnetically controlled valves.

Provision is made according to the present invention for a digital rotational speed comparison that the rotational speed comparison unit consists of two programmable backward counters of conventional type, whereby the upper driven or output rotational speed value is adapted to be inscribed into one backward counter and the lower driven or output rotational speed limit value is adapted to be inscribed into the other backward counter, and in that both counters are adapted to be counted backwards simultaneously during a measurement period by pulses having a frequency proportional to the driven or output rotational speed and in that a signal is adapted to be given off by each of the backward counters, when it reaches the value zero during the backward counting.

This can take place, for example, in such a manner that either a shifting-up signal is produced by the rotational speed comparison unit when the backward counter, into which the upper driven or output rotational speed limit value is adapted to be inscribed, produces a signal, or a shifting down signal if the backward counter into which the lower driven or output rotational speed limit value is adapted to be inscribed, does not produce a signal.

According to a further feature of the present invention, provision is made that acceleration limit values are adapted to be stored additionally in the constant storage or memory device for each speed, that the output of the constant storage or memory device is connected with an acceleration comparison unit, in which the acceleration limit values adapted to be released by the constant storage or memory device are adapted to be compared with the prevailing acceleration of the output shaft and in that in this acceleration comparison unit, signals are adapted to be triggered when exceeding or falling below the limit values, which are adapted to be fed to the electronic control unit as further influencing magnitudes, and in that additional driven or output rotational speed limit values are adapted to be stored in the constant storage or memory device which, in addition to being coordinated to torque and engaged speed, are additionally coordinated to these acceleration signals. It is achieved thereby that depending on the vehicle acceleration, different limit values can be offered, which is of great advantage especially within the torque ranges of full-gas and kick down, for example, for preventing hunting shifting operations, i.e., a to and fro shifting between two speeds.

For purposes of a digital acceleration comparison, provision is made according to the present invention that the acceleration comparison unit consists of two forward-backward counters of conventional construction, into one of which the upper acceleration limit value is adapted to be inscribed and into the other of which, the lower acceleration limit value is adapted to be inscribed, that both counters are adapted to be counted forwards simultaneously by pulses having a frequency proportional to the driven or output rotational speed during a first measuring period and after a pause, are adapted to be counted backwards during a second measuring period corresponding to the first measuring period, and that a signal is adapted to be produced by each of the two forward-backward counters if it reaches the value zero during the backward counting. If sufficient time exists between the individual rotational speed and/or acceleration comparison measurements, then for purposes of reducing the technical expenditures, provision is made that the comparison unit consists only of a single counter which examines sequentially according to the time multiplex method whether the upper limit value is exceeded or the lower limit value is fallen below. The influencing of the transmission by way of a conventional selecting lever is achieved in that a selecting lever program unit of logical circuits of conventional type is provided to the inputs of which are adapted to be fed in digital form at least the magnitudes of the selector-lever position, of the respectively engaged speed, of a shifting-up signal and of a shifting-down signal, and at the outputs of which appear shifting-up or shifting-down commands when a shifting-up or shifting-down is permitted and/or required by reason of the input magnitudes.

Therebeyond, with internal combustion engines having fuel injection, provision is possibly made according to the present invention that a signal which is conventionally produced by the injection pump during a control thereof and is fed to the selector lever program unit is effective like a shifting-up signal within the torque range of full-gas and kick-down and during an acceleration of the drive or input shaft below the upper acceleration limit value. The advantage of this arrangement is that the individual speeds can be driven out fully over their entire range. An appropriate construction of the selector-lever program unit will be described more fully hereinafter in detail.

If, during the drive the speed range is limited in the upward direction by the selector lever, provision is then made that a lower driven or output rotational speed limit value is adapted to be stored additionally in the constant storage or memory device for each speed, and in that, on the one hand, this driven or output rotational speed limit value is adapted to be inscribed into the corresponding backward counter of the rotational speed comparison unit and, on the other, no shifting-up commands can be given off by the selector lever program unit as long as the respectively engaged speed lies above the speed range corresponding to the selector lever position (force shifting back). Therebeyond, a forward-backward counter of conventional type is provided as speed storage or memory device which is adapted to be counted forwards by the shifting-up commands and is adapted to be counted backwards by the shifting-down commands and whose outputs are connected with the electronic control unit, the selector-lever program unit and the valve control. The respectively prevailing counter position then corresponds, at least during the forward speeds, to the speed which is engaged at the given time. Following the same, a valve control unit is provided which receives at its input as digital input magnitudes, the counter position of the speed storage or memory device and the position of the selector lever, and at the outputs of which control pulses for the shifting of the valves of the transmission are adapted to be produced in timely correct sequence. In order to attain frictionless shifting operations without shifting shocks, etc., in addition to the logical circuits, also delay members and throttle places, etc., which are required therefor, are provided in a known manner.

A central timing generator is provided in common for all structural groups, from which are obtainable the pulses and measurement periods required for a proper operation and orderly progress.

In order to assure the safety of the entire installation and to be able to recognize immediately a breakdown or failure, a speed monitoring installation with a speed determining unit is provided, to which are adapted to be fed the driving or input rotational speed and the output or driven rotational speed of the transmission, by means of which the respectively engaged speed can be determined from these magnitudes and is adapted to be compared with the speed stored in the speed storage or memory device, and from which a failure signal is adapted to be produced in case of noncoincidence of the two magnitudes.

According to the present invention, the speed-determining unit includes a forward-backward counter of conventional type, which during a predetermined measuring period is adapted to be counted forwards with the driving or input rotational speed and subsequently thereto is adapted to be counted backwards with the driven or output rotational speed whereby with the beginning of the backward counting a pulse starts for each speed from the central timing generator with a duration coordinated to the respective speed, and whereby memory or storage elements of conventional type are provided, into which a content corresponding to the respectively engaged speed is adapted to be inscribed by the then still present pulses, possibly after code conversion, at the moment at which the forward-backward counter reaches the value zero.

As a further safety measure, a transmitter failure safety system is provided for monitoring the driven or output rotational speed transmitter, to the input of which is adapted to be fed the driven or output rotational speed and which in case of failure or absence of the driven or output rotational speed, blocks the inputs of the speed storage or memory device with a delay exceeding a predetermined value and thus prevents a further automatic shifting of the transmission. For changing the transmission characteristics, provision is made that the programmable constant storage or memory device, i.e., the storage device with the constant values, includes several data sets for different ways of driving and/or operating conditions. The individual data sets are thereby selectable, for example, by push buttons at the instrument panel and/or additionally or exclusively by measurement sensors or feelers. A sensing or detection of the load condition is thereby contemplated in particular.

For different purposes, for example, during running-in or during special operation, other shifting curves than normally customary may be required. Provision is made therefor that the programmable constant storage or memory device is adapted to be exchanged. This possibility may be omitted with stores or memories having a sufficiently large capacity.

In addition to a selector lever position indicator device, provision is made as an auxiliary installation that an indicating device is provided which indicates the respectively engaged speed corresponding to the content of the speed storage or memory device.

The installation according to the present invention assures a farreaching protection of the engine and transmission and enables, at least from the technical side, generally a reduction of the risks when driving with heavy trucks.

An installation according to the present invention may also be so constructed that the driving or input torques are adapted to be stored and adapted to be compared with the respectively prevailing driving or input torque, i.e., abscissa and ordinate of the characteristic curves are interchanged with each other. The present invention provides that in lieu of the backward counter also forward counters and vice versa may be used.

Accordingly, it is an object of the present invention to provide an installation for the automatic shifting of change-speed transmissions which avoids by simple means the aforementioned shortcomings and drawbacks encountered in the prior art.

Another object of the present invention resides in an installation for the automatic shifting of change-speed gears in which the shifting thresholds can be carried without requiring expensive structural changes, thereby enabling different drive programs for different vehicles.

A further object of the present invention resides in an installation for automatically shifted change-speed transmissions which protects both engine and transmission against improper shifting, improper shifting speeds and other incorrect manipulations or operations that are likely to cause excessive wear in the engine and/or transmission.

A still further object of the present invention resides in an automatic transmission of the type indicated above in which the shifting points can be matched optimally to the prevailing driving conditions while simultaneously ensuring a protective operation of the transmission as well as better engine utilization.

Still another object of the present invention resides in an installation for automatically shifted change-speed transmissions which eliminates the difficulties heretofore encountered that generally limited automatically shifted transmission to four-speed transmission, yet does not entail unacceptable expenditures.

A still further object of the present invention resides in a control system for automatic transmissions in which the hydraulic system is limited to the actuation of the clutches and brakes while the control is carried out by electronic circuits, thereby eliminating both space requirements and costs compared to prior art devices.

These and further objects, features and advantages of the present invention will become more apparent from the following description when taken in connection with the accompanying drawing which shows, for purposes of illustration only, one embodiment in accordance with the present invention, and wherein:

FIG. 4a is a pulse diagram against time during a shifting-up operation for the rotational speed comparison unit of FIG. 3;

FIG. 4b is a diagram similar to FIG. 4a and illustrating a shifting-down operation;

FIG. 6 is a pulse diagram illustrating the operation of the acceleration comparison unit of FIG. 5;

Figure 1:
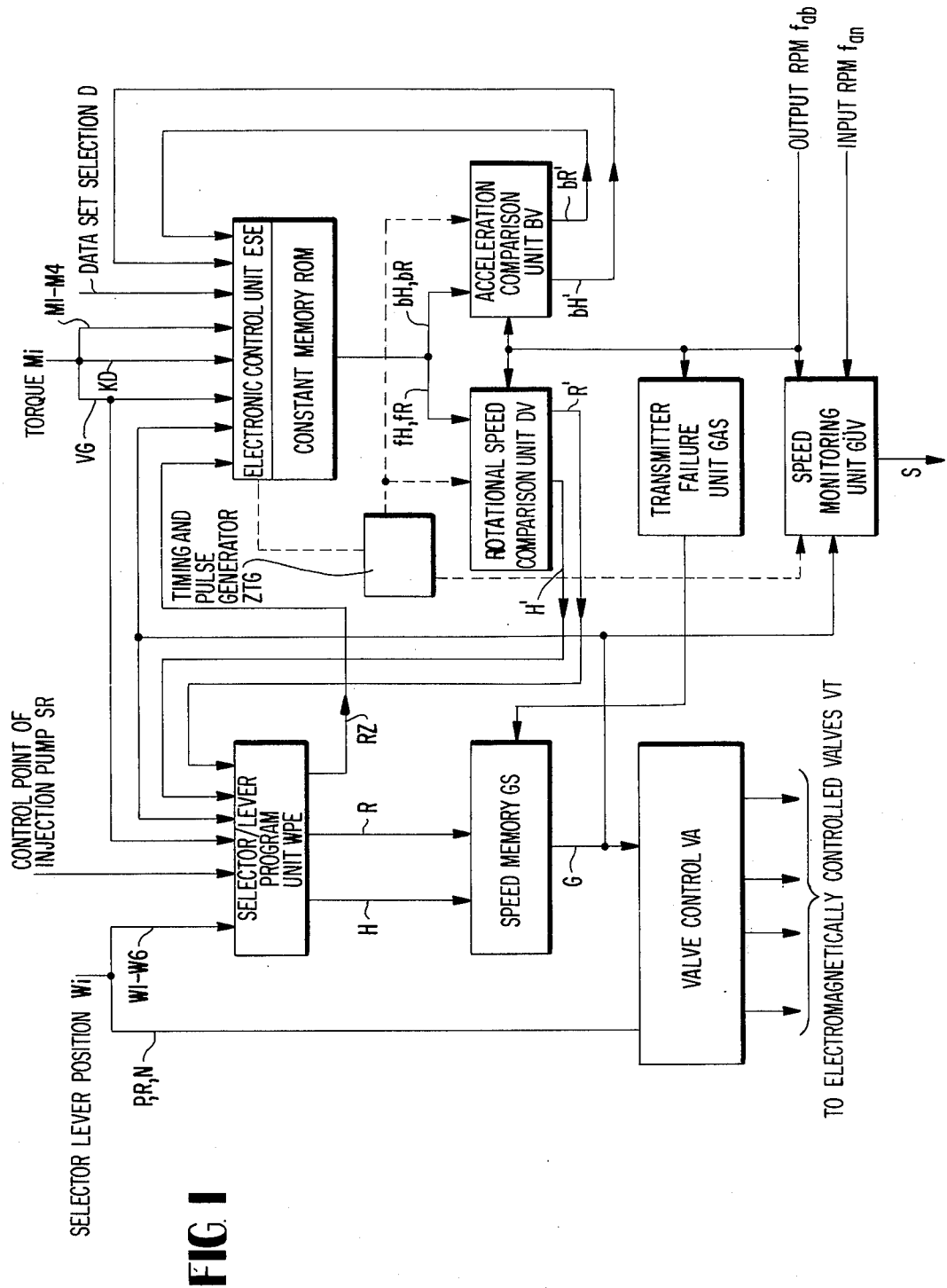
FIG. 1 is a schematic block diagram of the overall control installation in accordance with the present invention for the automatically shifting change-speed transmission.

Referring now to the drawing wherein like reference numerals and reference characters are used throughout the various views to designate like parts, the embodiment to be described more fully hereinafter and illustrated in the drawing involves a control shifting system for a fully automatic six-speed transmission, for example, for trucks. FIG. 1 illustrates a block diagram of the control shifting system according to the present invention.

The following input magnitudes are provided as digital input magnitudes in the control system according to the present invention: selector lever position Wi, torque Mi, control point of the injection pump SR, driving or input rotational speed $f_{an}$, driven or output rotational speed $f_{ab}$ and data set selection D. These input magnitudes are obtained in a conventional manner utilizing conventional pick-up or detecting elements as well as conventional means for converting the input magnitudes into digital signals. Since they are known in the art as such, a detailed description thereof is dispensed with herein.

The individual selector lever positions Wi, include the following forward speed ranges.

$W_1 \ldots G_1$
$W_2 \ldots G_1, G_2$
$W_3 \ldots G_1$ to $G_3$
$W_4 \ldots G_1$ to $G_4$
$W_5 \ldots G_1$ to $G_5$
$W_6 \ldots G_3$ to $G_6$ The selector lever positions P (parking), N (neutral) and R (reverse) and possibly also $R_1$, $R_2$ (additional reverse speeds), etc. depending on the number of reverse speeds, act directly on the valve control VA and are not included and/or are not affected by the electronic control shifting system.

The torque is derived from the drive pedal position in a conventional manner and is subdivided into six steps Mi:
  1. Torque step $M_1$
  2. Torque step $M_2$
  3. Torque step $M_3$
  4. Torque step $M_4$
  5. Torque step full gas VG 6. Torque step kick-down KD.

The driving (input) and driven (output) rotational speed $f_{an}$ and $f_{ab}$ of the transmission are determined in a conventional manner at the input and output shaft of the transmission by way of inductive or optical or other frequency transmitters of conventional type that are converted by conventional means into rectangular pulses whose frequency is proportional to the rotational speed.

The individual data sets D are selected depending on the operating conditions by the driver and/or automatically. The input magnitudes $Mi$ as well as the magnitudes to be explained hereinafter, namely, respectively engaged speed G, acceleration signal $bH'$, deceleration signal $bR'$ and forced shifting back RZ, are fed as inputs to the electronic control unit ESE and are processed by the same to the address for the control of the individual memory cells of the constant storage or memory device ROM. Corresponding to this respective address, a driven or output rotational speed limit value for the shifting-up $fH$ and a driven or output rotational speed limit value for the shifting-down $fR$ are inscribed (read-in) into a rotational speed comparison unit DV as well as an acceleration limit value $bH$ and a deceleration limit value $bR$ are inscribed (read-in) into an acceleration comparison unit BV, all in timed sequence following one another, by the constant storage or memory device ROM.

The prevailing driven or output rotational speed $f_{ab}$ is compared with the limit values $fH$ and $fR$ in the rotational speed comparison unit DV. When exceeding the limit value $fH$, a shifting-up signal $H'$ is produced while when falling below the limit value $fR$, a shifting-back signal $R'$ is produced.

In the acceleration comparison unit BV, the respective acceleration or deceleration is formed from the respective driven or output rotational speed $f_{ab}$ and is compared with the limit values $bH$ and $bR$. Depending on whether the actual acceleration (or deceleration) exceeds the limit value $bH$ or falls below the limit value $bR$, an acceleration signal $bH'$ or a deceleration signal $bR'$ are triggered off by the acceleration comparison unit BV, which are fed to the electronic control unit ESE and bring about the output or read-out of other driven or output rotational speed limit values out of the constant storage or memory device to the rotational speed comparison unit DV. In the instant example, this takes place only for the torque steps full gas VG and kick-down KD, though this may also be provided for other torque steps or stages. The shifting-up signal $H'$ and shifting-down signal $R'$ are fed to a selector lever program unit WPE. Additionally, also the magnitudes of selector lever position $Wi$ ($W_1$ to $W_6$) and the respectively engaged speed G are fed to this selector lever program unit WPE in digital form. The selector lever program unit WPE consists of a network of logical circuits of conventional type. In it will be examined whether during the appearance of shifting-up or shifting-down signals $H'$ or $R'$, it is possible to shift-up or to shift-down out of the respectively engaged speed without leaving the speed range preselected by the selector lever position. If this is the case (shifting-up or shifting-down release), the selector lever program unit WPE produces a shifting-up command H or a shifting-down command R to the following speed storage or memory device GS which is connected in the output thereof. If, however, this is not the case, i.e., if the speed range would be left, then during the appearance of shift-up or shifting-down signals $H'$ or $R'$, no shifting-up or shifting-down commands H or R are produced (shifting-up or shifting-down blocking).

If the actually engaged speed is below the selected speed range, which may occur, for example, during starting in $W_6$ or during the sudden change from, for example, $W_2$ to $W_6$, then shifting-up commands H are produced by the selector lever program unit WPE for such length of time until the lowest speed of the selected speed range is reached (forced shifting-up).

If the respectively engaged speed lies above the selected speed range, for example, after the shifting back from $W_5$ to $W_2$, then it is not possible to immediately shift back without danger in the absence of further measures. For this case, lower driven or output rotational speed limit values are stored in the constant storage or memory device ROM for each speed whereby it is possible to shift down without danger of excessive rotational speed when falling below the driven rotational speed limit values and which are then given off or read-out to the rotational speed comparison unit DV, when it is determined in the selector lever program unit WPE that a shifting back is necessary because the permissive speed range has been exceeded (forced shifting-back RZ). A signal RZ is transmitted from the selector lever program unit WPE to the electronic control unit ESE which then causes the release or output of this lower driven or output rotational speed limit value. As long as the signal RZ lasts, also no shifting-up commands H are produced, i.e., during the forced shifting-down, a shifting-up locking takes place automatically.

The shifting-up and shifting-down commands H and R reach the speed storage or memory device GS from the selector lever program unit WPE. The speed storage or memory device GS consists essentially of a forward-backward counter of conventional type which is caused to count forwards by the shifting-up commands H and is caused to count backwards by the shifting-down commands R and whose counter condition corresponds to the respectively engaged speed. The outputs of the speed storage or memory device GS are operatively connected with the selector lever program unit WPE, the electronic control unit ESE and the valve control VA. The selector lever positions parking position P, idling or neutral position N and the reverse speed or speeds R also lead directly to the valve control VA. The valve control VA essentially consists of conventional logical circuit elements, in which the positions of the selector lever and of the speed storage or memory device are converted in a conventional manner into control signals for electromagnetically controlled valves VT which act on the clutches and brakes of the automatic transmission.

Furthermore, a transmitter failure device GAS is present, in which during the sudden failure, i.e., absence of the driven or output rotational speed $f_{ab}$ blocks the speed storage or memory device GS so that it is no longer possible to shift automatically.

As a further safety device, a speed monitoring installation GÜV, to be described more fully hereinafter, is provided, to the inputs of which are fed the drive or input and the driven or output rotational speed $f_{an}$ and $f_{ab}$, which determines therefrom the actually engaged speed and compares the same with the speed stored in the speed storage or memory device GS. In case of non-coincidence or non-agreement of the two magnitudes, a fault signal S is produced.

The timing cycles, triggering pulses, time durations, etc. required in the system are produced in a central timing generator ZTG of conventional type and are fed to the individual groups.

Figure 2:
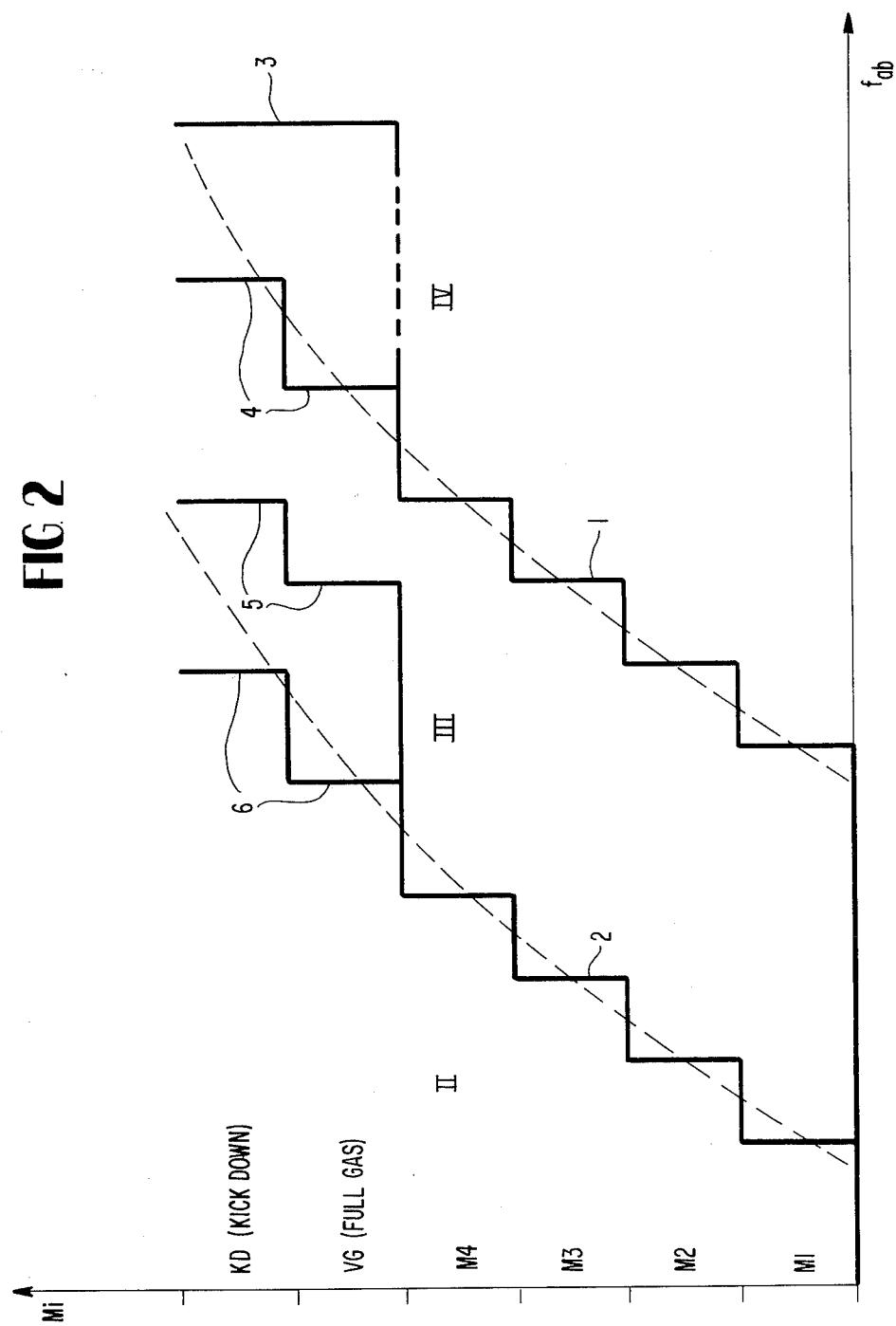
FIG. 2 is a diagram illustrating the shifting curves for a speed change which are stored in the constant store or memory according to the present invention.

FIG. 2 illustrates schematically the shifting-up curve 1 and the shifting-down curve 2 for a speed, for example, for third speed, stored in the constant storage or memory device ROM. To the left of the curve 2 then lies the second speed and to the right of the curve 1 lies the fourth speed. The transmission output or driven rotational speed $f_{ab}$ is plotted along the abscissa while the torques $Mi$ are plotted along the ordinate. The ideal curves shown in dash lines, are shown actually in digital forms in the steps coordinated to the torque stages or steps. In the two torque ranges full gas VG and kickdown KD, each curve consists of two alternate branches. The shifting-up curve splits off into a branch 3 which is then produced as upper driven or output rotational speed limit value and is fed to the rotational speed comparison unit DV when the acceleration of the output shaft lies below the acceleration limit value $bH$ valid for third speed, and into a branch 4 which is produced analogously as upper driven rotational speed limit value $fH$ and is fed to the rotational speed comparison unit DV, when exceeding the acceleration limit value $bH$.

Correspondingly, the shifting-down curve 2 splits up into a branch 5 when the deceleration of the output shaft exceeds the deceleration limit value $bR$ and into a branch 6 when the deceleration limit value $bR$ is not fallen below. In the two torque steps VG and KD, one driven or output rotational speed limit value each is therefore produced and fed to the rotational speed comparison unit DV from the curve sections 3 and 6 at no acceleration or deceleration or at small accelerations or decelerations, from the curve section 4 and 6 during a high acceleration and from the curve sections 3 and 5 during a high deceleration. The same driven or output rotational speed limit value $f_{ab}$ is coordinated thereby in the curve branch 3, for example, to both torque steps or the same is replaced by the control point SR of the injection pump which is indicated by the interrupted line in the horizontal portion of this curve branch.

Figure 3:
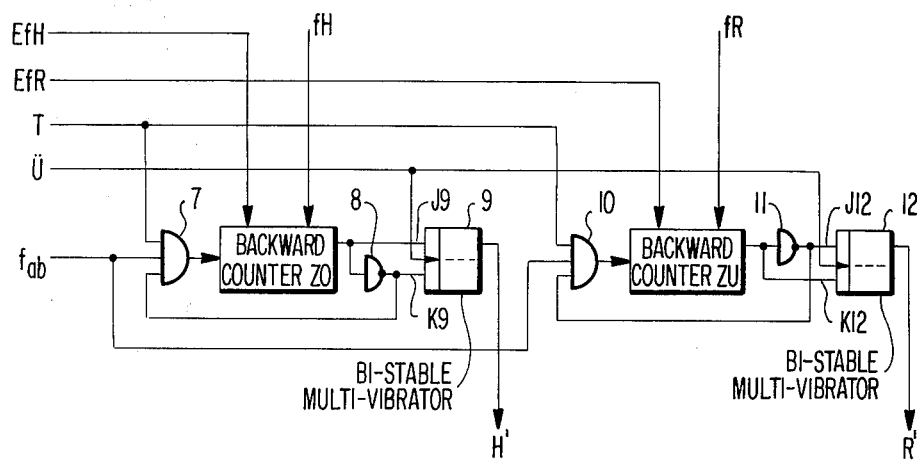
FIG. 3 is a schematic block diagram of a rotational speed comparison unit in accordance with the present invention.

FIG. 3 illustrates schematically the construction of the rotational speed comparison unit DV. It essentially consists of a backward counter ZO of conventional type for the upper rotational speed limit value $fH$ and of a backward counter ZU of conventional type for the lower rotational speed limit value $fR$. The upper rotational speed limit value $fH$ and the lower rotational speed limit $fR$ are fed to the rotational speed comparison unit DV from the constant storage or memory device ROM. The signals and measurement periods necessary therefor which will be listed hereinafter, are obtained from the central timing generator ZTG:

E$fH$ : pulse for inscribing the upper driven or output rotational speed limit value $fH$ into the counter ZO;

E$fR$ : pulse for inscribing the lower rotational speed limit value $fR$ into the counter ZU;

T : measurement time for the backward counting of the driven or output rotational speed $f_{ab}$; and Ü : pulse for the transfer of the result.

The rotational speed comparison unit DV produces a shifting-up signal H' when exceeding the upper driven rotational speed limit value or a shifting-down signal R' when falling below the lower driven rotational speed limit value.

The operation of the counter ZO will be explained hereinafter by reference to FIGS. 4a and 4b. With the appearance of the pulse E$fH$, the upper driven rotational speed limit value $fH$ is inscribed into the counter ZO from the constant storage or memory device ROM. This value corresponds to a number of pulses $f_{ab}$ which the sensor or pick-up mounted at the output shaft has to produce within the measuring period of time T if the output shaft rotates with the rotational speed corresponding to this value. During this measurement period of time T, the counter ZO is now counted backwards by means of the pulses of $f_{ab}$. After the lapse or termination of the measurement period of time T or, if it has reached beforehand the value zero, the counter is stopped, i.e., the signal $f_{ab}$ is blocked by way of a conventional AND-element 7. This AND-element 7 has three inputs, to the first input of which is fed the measurement time T, to the second input of which is fed the driven or output rotational speed $f_{ab}$ and to the third input of which is fed the negative output of the counter ZO which is converted into a negative signal by an inverter 8 of conventional construction. The counter ZO is so constructed by conventional means that the 1-signal appears at its output when the counter condition is zero. The output or driven rotational speed $f_{ab}$ therefore reaches the counter only as long as the value zero is not reached during the measurement period of time T.

The output of the counter ZO is directly connected with a setting input J9 and by way of the inverter 8 with the reset input K9 of a bistable multivibrator 9 of conventional construction, to the timing input of which are fed the pulses Ü. If the counter ZO has reached the value zero during the measurement period of time T, i.e., has exceeded the limit value, then the 1-signal is present at the output and at the setting input J9 of the bistable multivibrator 9 up to the inscription of the next limit value, whereas the 0-signal is present at the reset input K9. The bistable multivibrator 9 is a conventional JK-flip-flop circuit, i.e., the flip-flop is set and therewith a shifting-up signal H' is produced when at the arrival of the pulse Ü, the output of counter ZO carries the 1-signal.

The operation of the counter ZU is identical with that of the counter ZO, however, with the difference that the output of the counter ZU is directly connected with the reset input $K_{12}$ of a bistable multivibrator 12 and by way of an inverter 11 with the setting input $J_{12}$ of the bistable multivibrator 12 and with an input of the AND-element 10. As a result thereof, the bistable multivibrator 12 is set when the counter ZU carries the 0-signal at the arrival of the signal Ü, i.e., the counter condition 0 has not been reached.

FIGS. 4a and 4b illustrate the progress and operation of the rotational speed comparison in the rotational speed comparison unit DV as a function of time. The upper rotational speed limit value $fH$ is inscribed into the counter ZO by means of the signal $fH$ and subsequently the lower rotational speed limit value $fR$ is inscribed into the counter ZU by means of the signal E$fR$. During the following measurement period of time T, both counters are counted backwards by means of the signals $f_{ab}$. The slope or steepness of the curves corresponds to the prevailing driven or output rotational speed, the curves themselves are stepped curves corresponding to a conventional digital counting operation with whole numbers illustrated in the circle 13. After the end of the measurement period of time T, the two bistable multivibrators 9 and 12 are set by means of the pulse Ü corresponding to the output signals of the counters ZO and ZU and corresponding to the prepairing inputs thereof and therewith a shifting-up signal H', a shifting-down signal R' or none of the two are produced. A new measurement cycle commences with the next pulse E/H.

Three measurement cycles are illustrated in FIG. 4a. During the first measurement cycle, the limit value fH₁ is inscribed into the counter ZO and the limit value fR₁ is inscribed into the counter ZU. During the following backward counting, the counter ZO does not reach the value zero whereas the counter ZU reaches the value zero. The bistable multivibrators 9 and 12 are so set by means of the pulse Ü that neither a shifting-up nor a shifting-down signal H' or R' takes place. The driven or output rotational speed lies between the limit values.

During the next measurement cycle, the same limit values are therefore inscribed. IN the meantime, however, the driven or output rotational speed has increased and both counters reach the value zero.

Consequently, a shifting-up signal H' appears with the signal Ü at the output of the bistable multivibrator 9. This shifting-up signal H' is examined in the selector lever program unit WPE (now shown) and produces a shifting-up command H which increases or raises the speed storage or memory device GS by 1. During the next measurement cycle, therefore, the limit values fH₂ and fR₂ for this higher speed are inscribed into the counters ZO and ZU. During this measurement cycle, the counter ZO does not reach the value zero whereas the counter ZU reaches the value zero. The bistable multivibrators 9 and 12 are set to zero by means of the pulse Ü, i.e., the shifting-up signal H' disappears again. Consequently, a shifting-up signal H' appears always when the counter ZO reaches the value zero and disappears after the measurement cycle in which it does not reach the value zero.

For a shifting-back operation, the criterion is that the counter ZU does not reach the value 0. The counter ZU is then set to the 1-signal, i.e., it produces a shifting-down signal R'. The previously inscribed limit values fH₃ and fR₃ are replaced by the limit values fH₄ and fR₄ for the lower speed, and during the first measurement cycle during which the counter ZU again reaches the value zero, the shifting-down signal R' again disappears (see FIG. 4b).

Figure 5:
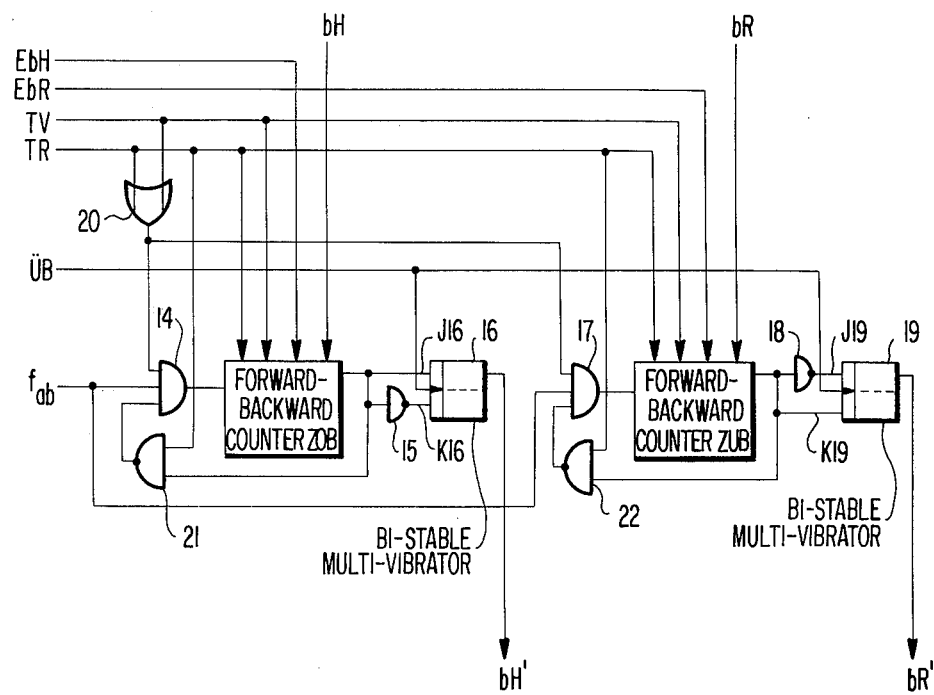
FIG. 5 is a schematic block diagram of an acceleration comparison unit in accordance with the present invention.

FIG. 5 illustrates schematically the construction of the acceleration comparison unit BV. It essentially consists of a forward-backward counter ZOB of conventional construction for the upper acceleration limit value bH and of a forward-backward counter ZUB of conventional construction for the lower deceleration limit value bR.

At first, the counter ZOB and its operation in principle will be described more fully.

The acceleration of the driven or output shaft is compared with the upper acceleration limit value bH in that this limit value is transferred from the constant storage or memory device ROM to the forward-backward counter ZOB. Thereafter, during a fixed measurement period TV, the counter ZOB is counted forwards by means of the frequency $f_{ab}$ proportional to the driven or output rotational speed and after an also fixed pause TP, is counted backwards during a measurement period TR equal to the period of measurement TV. The sum of the acceleration limit value bH and of the difference quotient of the driven or output rotational speeds during the forward and backward counting and of the sum of the measurement period TR and pause TP, is then indicated in the counter: counter condition $$Z = bH + \frac{\frac{Z1}{TV} - \frac{Z2}{TR}}{TR + TP} \quad \begin{array}{l} TV = TR \\ TR + TP = T_{ges} \end{array}$$

whereby
$Z1/TV$ is the pulse number during the time period $TV = f_{ab1}$, and
$Z2/TR =$ the pulse number during the period of time $TR = f_{ab2}$, $$\text{Whence} \quad Z = bH + \frac{f_{ab1} - f_{ab2}}{T_{ges}},$$

and $T_{ges} = TR + TP =$ overall period of time.

If the counter reaches the value zero during the backward counting, then the prevailing acceleration limit value is exceeded.

The signals TV and TR, which are used as commands for the forward or backward counting as well as a command EbH for the inscription of the upper driven or output rotational speed limit value bH, are fed to the forward-backward counter ZOB in timely correct duration and sequence. The driven or output rotational speed $f_{ab}$ to be measured reaches one of three inputs of a conventional AND-element 14 and is then passed on to one of the inputs of the counter ZOB only, when TV or TR which are connected with each other by way of a conventional OR-element 20 whose output forms the second input of the AND-element 14, carry the 1-signal and simultaneously the output of a conventional NAND-element 21 which forms the third input of the AND-element 14, also carries the 1-signal. The output of the NAND-element 21 then always has the 1-signal when TR and the output of the counter ZOB do not carry at the same time the 1-signal. The counter ZOB is so connected in a conventional manner that upon reaching the value zero, it carries the 1-signal at the output. It is achieved by the NAND-element 21 that the counter is stopped if it reaches the value zero while counting backwards.

The output of the counter ZOB is directly fed to the preparatory input $J_{16}$ of a following bistable multivibrator 16 consisting of a conventional JK flip-flop and to the other preparatory input $K_{16}$ by way of an inverter 15. The command ÜB by means of which the flip-flop is set, reaches the timing input thereof when the 1-signal exists at the preparatory input $J_{16}$. A shifting-up signal bH' then appears at the output of the bistable multivibrator 16.

The construction of the counter ZUB, as also the function of the AND and NAND-elements 17 and 22 is identical with that of the counter ZOB, however, with the exception that the command signal EbR is fed thereto for inscribing the lower acceleration limit value bR and that its output is connected directly with the preparatory input $K_{19}$ and with the input $J_{19}$ by way of an inverter 18. The bistable multivibrator 19 is set with the appearance of the signal ÜB and therewith the shifting-down signal bR' is produced when the counter has not reached the value zero during the backward counting.

In the counter ZUB will be examined whether the lower acceleration limit value bR is fallen below, i.e., whether a predetermined deceleration is exceeded. The limit value $bR$ can be detected as negative limit value, in relation to the zero value, which the counter reaches during the counting-up beyond its maximum counter content. The counter content of the counter ZUB is also illustrated in this sense in FIG. 6.

FIG. 6 illustrates a pulse diagram illustrating the progress of the acceleration comparison measurement as a function of time.

In this diagram, the following designations have the following meaning:

E$b$H : command for the inscription of the upper acceleration limit value $bH$ in the counter ZOB;

E$b$R : command for the inscription of the lower acceleration limit value $bR$ in the counter ZUB;

TV: measurement period of time and command for the forward counting;

TR : measurement period of time and command for the backward counting;

TP : measurement pause between the end of TV and the beginning of TR;

ZOB : counter content of ZOB;

ZUB : counter content of ZUB;

ÜB : command for the transfer of the measurement result into the bistable multivibrators;

$bH'$ : acceleration signal;

$bR'$ : deceleration signal.

A measurement cycle extends respectively from one to the next rise (leading edge) of the command pulse E$b$H. The two acceleration limit values $bH$ and $bR$ are inscribed following one another in timed sequence into the two counters ZOB and ZUB by means of the commands E$b$H and E$b$R and thereafter the two counters are simultaneously counted forwards by means of the signals $f_{ab}$ during the period of time TV and after a pause TP, are counted backwards during the period of time TR.

The two measurement results are then transferred simultaneously into the bistable multivibrators 16 and 19 by means of the pulses ÜB. Four entire measurement cycles are illustrated in FIG. 6. During the first measurement cycle, the value zero is not reached by the counter ZOB, whereas it is reached by the counter ZUB, i.e., the driven or output shaft or the vehicle is within the range between the acceleration limit values, whereby driven or output rotational speed limit values of the partial curves 3 and 6 (FIG. 2) are given out or released within the full-gas range VG and the kickdown range KB, respectively.

In the second measurement cycle, both counters ZOB and ZUB do not reach the value of zero so that a deceleration signal $bR'$ appears and as long as this deceleration signal $bR'$ lasts, the driven or output rotational speed limit values of the partial curves 3 and 5 (FIG. 2) are released or given out. The third measurement cycle corresponds again to the first measurement cycle so that subsequently the deceleration $bR'$ again disappears. In the fourth measurement cycle, finally both counters ZOB and ZUB reach during backward counting the value zero, i.e., the signal $bH'$ appears whereupon the driven or output rotational speed values of the partial curves 4 and 6 FIG. 2) are given out or released and fed to the rotational speed comparison unit DV as long as the signal $bH'$ lasts.

Figure 7:
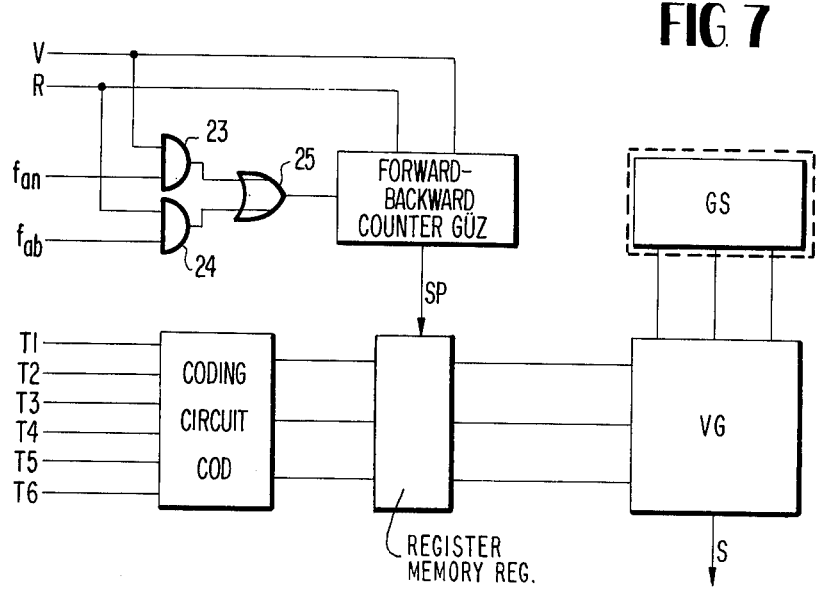
FIG. 7 is a schematic block diagram of a speed-monitoring installation in accordance with the present invention.

FIG. 7 illustrates schematically the circuit diagram of a speedmonitoring device GÜV according to the present invention.

Figure 8:
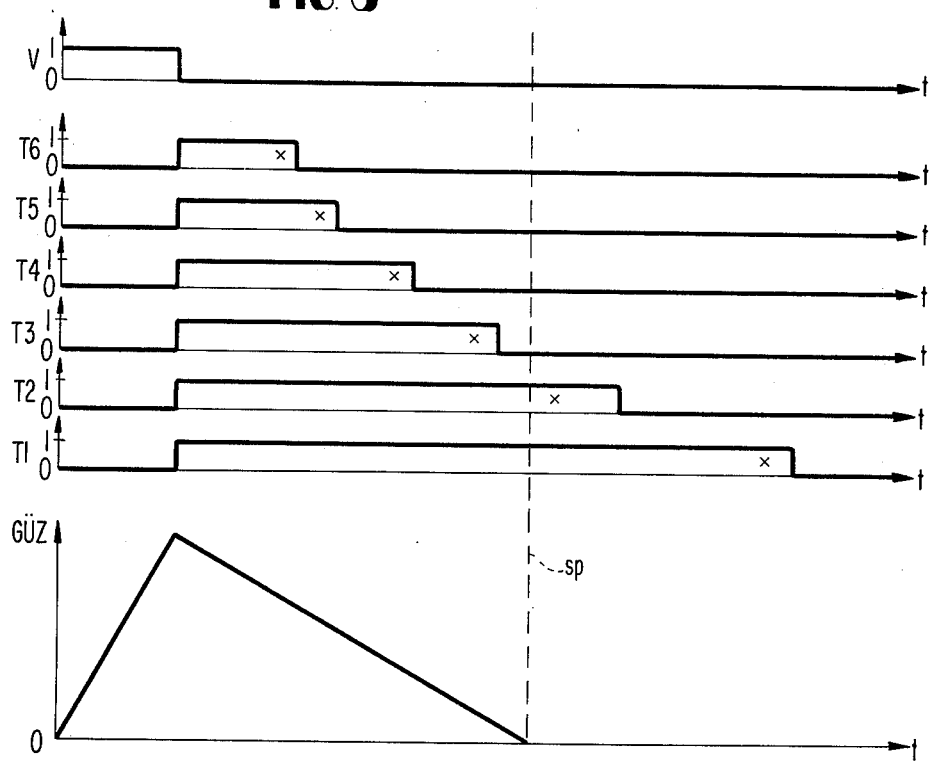
FIG. 8 is a pulse diagram explaining the operation of the speed-monitoring system of FIG. 7.

The pulse diagram belonging to the speed monitoring device GÜV of FIG. 7 is illustrated in FIG. 8. The speed monitoring device consists of an independent speed-determining device whose result is compared with the content of this speed storage or memory device GS and in case of non-agreement produces a fault signal S.

The speed-determining device GÜV includes a forward-backward counter GÜZ of conventional construction which during the constant period of time V is counted forward from zero with the driving or input rotational speed $f_{an}$ and during the period of time $R = \overline{V}$ is again counted backwards to zero with the driven or output rotational speed $f_{ab}$. The same number of pulses for the input and output shaft per shaft rotation, and a constant velocity presupposed, means:

$$t_{an} \cdot f_{an} = t_{ab} \cdot f_{ab},$$

$$t_{ab} = t_{an} \frac{f_{an}}{f_{ab}} = t_{an} \cdot \ddot{U}$$

whereby:

$t_{an}$ is the measurement duration, during which forward counting takes place by means of $f_{an}$.

$t_{ab}$ is the duration of time which the counter requires in order to reach again the value of zero, counting backwards with $f_{ab}$, $f_{an}$ and $f_{ab}$ are input (driving) and output (driven) rotational speed, respectively, Ü is the transmission ratio.

Depending upon which speed is engaged, the backward counting operation with a constant forward counting duration of time $t_{an}$ (designated by V in FIGS. 7 and 8) will therefore require a time duration or period of time dependent on the transmission ratio. For the individual speeds, the end of these periods of time is indicated in FIG. 8 by means of an asterisk whereas the beginning is in each case the rise or front end of the pulse $T_1$ to $T_6$. If one adds thereto respectively the changes of these periods of time which are possible during the determination process at maximum acceleration or deceleration, then the pulse durations for $T_1$ to $T_6$ of the six-speed transmission result therefrom.

In FIG. 7, the commands V for forward counting and $R (= \overline{V})$ for backward counting are fed to the forward-backward counter GÜZ from the central timing generator ZTG. The signals V and $f_{an}$ are fed to one input of an AND-element 23 and the signals R and $f_{ab}$ to one input of an AND-element 24. The outputs of the two AND elements 23 and 24 form the inputs of an OR-element 25 whose output is connected with the counter input of the counter GÜZ. It is achieved by this circuit connection that during the period of V one counts forwards by means of the signal $f_{an}$ and during the period of time R, one counts backwards by means of the signal $f_{ab}$. The counter GÜZ is so connected by conventional means that it stops during backward counting when reaching the value zero. With the beginning of the backward counting, the pulses $T_1$ to $T_6$ are conducted from the central timing generator ZTG to a conventional coding circuit (COD) in which they are coded to the code of the speed storage or memory device GS. The code converted values are fed to an input of a following register storage or memory device REG and are transferred into the same at the moment where the counter GÜZ reaches the value zero and gives off a pulse SP to the register storage memory device REG. In FIG. 8, this point of time is illustrated by a vertical dash line sp. At this moment, the periods $T_3$ to $T_6$ have already run out, only T₁ and T₂ still carry the 1-signal. This corresponds to the second speed. In a comparison circuit VG of conventional construction, the content of the register storage or memory device REG is compared with the content of the speed storage or memory device GS and a fault signal S is produced in case of non-agreement of the two values.

As mentioned above, the various elements indicated in block involve circuits and circuit elements of conventional type which are commercially available. For example, the electronic control unit ESE essentially consists of simple logic circuits such as logic gate elements for the eight inputs thereof which are opened and closed by the timing pulses. The constant memory ROM is a conventional integrated circuit, for example, of the type Intel MF 1702 of Microsystems International. The selector level program unit WPE also consists of conventional NOR- and NAND-elements, while the speed memory GS utilizes a conventional forward-backward counter consisting of conventional flip-flops with a control by the use of simple logic circuit elements, e.g. of the type CD 4027 AD, Digital Integrated Circuits, RCA File No. 503. The valve control VA also consists of simple logic circuits involving logic elements whereby the control of the valve takes place from the position of the storage memory GS, as known to a person skilled in the art. The transmitter failure device GAS also utilizes known circuits, for example, as shown and described in FIG. 6 of the German Offenlegungsschrift No. 2,036,732. The Central Timing Generator TZG consists of conventional integrated circuits, for example, utilizing digital integrated circuits of the type CD 4047 and CD 4040, RCA, whereby the CD 4040 circuit is connected in the output of the type CD 4047 circuit and whereby the outputs of the type CD 4040 circuit may be interconnected with each other by conventional logic elements in order to obtain all the desired time durations. All of the forward-backward counters referred to in this case involve conventional integrated circuits, for example, of the type CD 4029 of RCA. The inscription of the values takes place in a conventional manner by way of the JAM inputs of the integrated circuit CD 4029 (RCA). The coding circuit COD of FIG. 7 also involves conventional circuits utilizing conventional logic elements in which the signals corresponding to the engaged speed in the speed memory GS are formed from the present pulses T₁ to T₆. The register memory REG consists of memory flip-flops of conventional type into which these signals are then adapted to be transferred. In summary, the various elements indicated only schematically in block diagram involve only conventional circuits and conventional logic elements, used in a manner as known to persons skilled in the art, and therefore are not described in greater detail herein for the sake of simplicity.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the automatic shifting of change-speed transmissions which includes actuating means for the engagement and disengagement of the speeds, the actuating means being controllable by way of control means by at least two influencing magnitudes, characterized in that an electronic control unit having a programmable constant memory means is provided, in which is stored at least one set of output rotational speed limit values coordinated to the individual speeds and torque steps, means for applying to the electronic control unit by way of corresponding inputs at least the influencing magnitudes of torque and engaged speed, said constant memory means including an output operatively connected with a rotational speed comparison means in which the driven rotational speed limit values produced by the constant memory means are compared with the respective output rotational speed of the transmission, said rotational speed comparison means being operable to trigger shifting-up or shifting-down signals, when exceeding or falling below the limit values, and means for applying the shifting-up and shifting-down signals to the actuating means, and further characterized in that the transmission has a transmission output shaft, in that acceleration limit values are additionally storable in the constant memory means for each speed, the output of the constant memory means being operatively connected with an acceleration comparison means, in which the acceleration limit values produced by the constant memory means are compared with the prevailing acceleration of the output shaft of the transmission, said acceleration comparison means being operable to produce signals when exceeding and falling below the limit values which are fed as a further influencing magnitude to the electronic control unit, and in that output rotational speed limit values are additionally storable in the constant memory means which, in addition to torque and engaged speed, are coordinated to the acceleration signals.

2. An installation according to claim 1, characterized in that the at least two influencing magnitudes are output rotational speed and driving torque.

3. An installation according to claim 1, characterized in that the rotational speed comparison means includes two programmable backward counter means, the upper driven rotational speed limit value being adapted to be inscribed into one of said backward counter means and the lower output rotational speed limit value into the other of the backward counter means, both backward counter means being operable to be counted backwards simultaneously during a period of measurement by pulses having a frequency proportional to the output rotational speed, and each backward counter means producing a signal if it reaches the value zero when counting backwards.

4. An installation according to claim 3, characterized in that a shifting-up signal is produced by the rotational speed comparison means when the backward counter means thereof, into which the upper output rotational speed limit value is adapted to be inscribed, produces a signal, and a shifting down signal is produced in the rotational speed comparison means, when the backward counter means into which the lower output rotational speed limit value is adapted to be inscribed, does not produce a signal.

5. An installation according to claim 1, characterized in that the acceleration comparison means includes two forward-backward counter means, into one of which is inscribable the upper acceleration limit value and into the other one of which is inscribable the lower acceleration limit value, both forward-backward counter means being operable to be counted forwards simultaneously during a first measurement period of time by pulses having a frequency proportional to the output rotational speed and after a pause, are operable to be counted backwards during a second measurement period of time corresponding substantially to the first measurement period of time, each of said forward-backward counter means being operable to produce a signal if it reaches the value zero during the backward counting.

6. An installation according to claim 1, characterized in that at least one of the comparison means consists of only one counter means which examines sequentially according to the time multiplex method whether the upper limit value has been exceeded and the lower limit value has been fallen below.

7. An installation according to claim 1, characterized in that the comparison means consists of only one counter means which examines sequentially according to the time multiplex method whether the upper limit value has been exceeded and the lower limit value has been fallen below.

8. An installation according to claim 1, characterized in that a selector lever program means including logic elements is provided having several inputs and outputs, at least the magnitudes of selector lever position, respectively engaged speed, shifting-up signal and shifting-down signal being adapted to be fed to the inputs of the selector lever program means in digital form, and the selector lever program means being operable to produce shifting-up and shifting-down commands which appear at the outputs of the selector lever program means when a shifting-up or shifting-down is called for by the input magnitudes thereof.

9. An installation according to claim 8, characterized in that the shifting-up and shifting-down commands appear at the outputs of the selector lever program means when the same are permitted on the basis of the input magnitudes.

10. An installation according to claim 9, characterized in that the shifting-up and shifting-down commands appear at the outputs of the selector level program means when a shifting-up or shifting-down is necessary on the basis of the input magnitudes.

11. An installation according to claim 8, characterized in that shifting-up commands appear at the output of the selector lever program means as long as the actually engaged speed lies below the speed range corresponding to the selector lever position.

12. An installation according to claim 11, characterized in that shifting-up signals appearing at the input of the selector lever program means effect shifting-up commands at the output thereof as long as the highest speed of the respective speed range is not engaged.

13. An installation according to claim 12, characterized in that shifting-up signals appearing at the input of the selector lever program means do not effect a shifting-up command at the output thereof when the highest speed of the respective speed range is engaged.

14. An installation according to claim 13, characterized in that shifting-down signals appearing at the input of the selector lever program means effect shifting-down commands at the output thereof as long as the lowest speed of the respective speed range is not engaged.

15. An installation according to claim 14, characterized in that shifting-down signals appearing at the input of the selector lever program means do not effect a shifting-down command at the output thereof when the lowest speed of the respective speed range is engaged.

16. An installation according to claim 8, characterized in that a lower output rotational speed limit value is adapted to be stored additionally in the constant memory means for each speed, and in that on the one hand, the last-mentioned output rotational speed limit value is adapted to be inscribed into the corresponding backward counter means of the rotational speed comparison means and, on the other hand, no shifting-up commands are produced by the selector lever program means as long as the respectively engaged speed lies above the speed range corresponding to the selector lever position.

17. An installation according to claim 16, characterized in that a forward-backward counter means is provided as speed memory means which is operable to be counted forwards by the shifting-up commands and is operable to be counted backwards by the shifting-down commands, said speed memory means having outputs operatively connected with the electronic control unit, the selector lever program means and valve control means.

18. An installation with valves for the transmission according to claim 17, characterized in that a valve control means is provided having input and output means, the counter position of the speed memory means and the position of the selector lever being adapted to be fed as digital input magnitudes to the valve control means, and said valve control means being operable to produce control pulses for shifting the valves of the transmission at the output means thereof in timely correct sequence.

19. An installation according to claim 18, characterized in that a central timing generator means is provided which produces the pulses and measurement period required for an orderly operation of the installation.

20. An installation according to claim 19, characterized in that a speed monitoring means having a speed-determining means is provided, the input rotational speed and output rotational speed of the transmission being adapted to be fed as inputs to the speed-monitoring means, said speed-monitoring means being operable to determine from said magnitudes the respectively engaged speed and being operable to compare the same with the speed stored in the speed memory means and being operable to produce a pulse signal in case of non-agreement of the two magnitudes.

21. An installation according to claim 20, characterized in that the speed-determining means includes a forward-backward counter means which is operable to be counted forwards with the input rotational speed during a predetermined measurement period and subsequently is operable to be counted backwards with the output rotational speed, one pulse for each speed which commence with the beginning of the backward counting, being produced by the central timing generator means, the pulses having a duration coordinated to the corresponding speed, and memory means being provided, into which the content corresponding to the respectively engaged speed is adapted to be inscribed at the moment at which the last-mentioned forward-backward counter means reaches the value zero, by the then still-present pulses.

22. An installation according to claim 21, characterized in that the content corresponding to the respectively engaged speed is inscribed into the forward-backward counter means upon code conversion in a code converting means.

23. An installation according to claim 21, characterized in that a transmitter failure safety means is provided having an input, to which is fed the output rotational speed and being operable to block the inputs of the speed memory means in case of failure of the output rotational speed with a delay exceeding a predetermined value and thereby preventing a further automatic shifting of the transmission.

24. An installation according to claim 23, characterized in that the programmable constant memory means has several data sets for different conditions.

25. An installation according to claim 24, characterized in that said conditions correspond to different modes of driving.

26. An installation according to claim 25, characterized in that said conditions correspond to different operating conditions.

27. An installation according to claim 24, characterized by means for selecting the individual data set at will by the driver.

28. An installation according to claim 27, characterized in that said last-mentioned means includes push buttons provided at the instrument panel.

29. An installation according to claim 27, characterized by measurement sensor means for selecting the individual data sets.

30. An installation according to claim 29, characterized in that the individual data sets are selectable additionally by said measurement sensor means.

31. An installation according to claim 24, characterized by measurement sensor means for selecting the individual data sets.

32. An installation according to claim 31, characterized in that the individual data sets are selectable exclusively by the measurement sensor means.

33. An installation according to claim 24, characterized in that the programmable constant memory means is interchangeable.

34. An installation according to claim 33, characterized by an indicating means which indicates the respectively engaged speed corresponding to the speed memory content.

35. An installation according to claim 8, characterized in that the shifting-up and shifting-down commands appear at the outputs of the selector lever program means when a shifting-up and shifting-down is necessary on the basis of the input magnitudes.

36. An installation according to claim 8, characterized in that shifting-up signals appearing at the input of the selector lever program means effect shifting-up commands at the output thereof as long as the highest speed of the respective speed range is not engaged.

37. An installation according to claim 8, characterized in that shifting-up signals appearing at the input of the selector lever program means do not effect a shifting-up command at the output thereof when the highest speed of the respective speed range is engaged.

38. An installation according to claim 8, characterized in that shifting-down signals appearing at the input of the selector lever program means effect shifting-down commands at the output thereof as long as the lowest speed of the respective speed range is not engaged.

39. An installation according to claim 8, characterized in that shifting-down signals appearing at the input of the selector lever program means do not effect a shifting-down command at the output thereof when the lowest speed of the respective speed range is engaged.

40. An installation according to claim 8, characterized in that a forward-backward counter means is provided as speed memory means which is operable to be counted forwards by the shifting-up commands and is operable to be counted backwards by the shifting-down commands, said speed memory means having outputs operatively connected with the electronic control unit, the selector lever program means and valve control means.

41. An installation with valves for the transmission according to claim 9, characterized in that a valve control means is provided having input and output means, the counter position of the speed memory means and the position of the selector lever being adapted to be fed as digital input magnitudes to the valve control means, and said valve control means being operable to produce control pulses for shifting the valves of the transmission at the output means thereof in timely correct sequence.

42. An installation according to claim 1, characterized in that a central timing generator means is provided which produces the pulses and measurement periods required for an orderly operation of the installation.

43. An installation according to claim 42 characterized in that a speed monitoring means having a speed-determining means is provided, the input rotational speed and output rotational speed of the transmission being adapted to be fed as inputs to the speed-monitoring means, said speed-monitoring means being operable to determine from said magnitudes the respectively engaged speed and being operable to compare the same with the speed stored in the speed memory means and being operable to produce a pulse signal in case of non-agreement of the two magnitudes.

44. An installation according to claim 43, characterized in that the speed-determining means includes a forward-backward counter means which is operable to be counted forwards with the input rotational speed during a predetermined measurement period and subsequently is operable to be counted backwards with the output rotational speed, one pulse for each speed which commence with the beginning of the backward counting, being produced by the central timing generator means, the pulses having a duration coordinated to the corresponding speed, and memory means being provided, into which the content corresponding to the respectively engaged speed is adapted to be inscribed at the moment at which the last-mentioned forward-backward counter means reaches the value zero, by the then still-present pulses.

45. An installation according to claim 44, characterized in that the content corresponding to the respectively engaged speed is inscribed into the forward-backward counter means upon code conversion in a code converting means.

46. An installation according to claim 43, characterized in that a transmitter failure safety means is provided having an input, to which is fed the output rotational speed and being operable to block the inputs of the speed memory means in case of failure of the output rotational speed with a delay exceeding a predetermined value and thereby preventing a further automatic shifting of the transmission.

47. An installation according to claim 1, characterized in that the programmable constant memory means has several data sets for different conditions.

48. An installation according to claim 47, characterized in that said conditions correspond to different modes of driving.

49. An installation according to claim 47, characterized in that said conditions correspond to different operating conditions.

50. An installation according to claim 47, characterized by means for selecting the individual data set at will by the driver.

51. An installation according to claim 50, characterized in that said last-mentioned means includes push bottons provided at the instrument panel.

52. An installation according to claim 47, characterized by measurement sensor means for selecting the individual data sets.

53. An installation according to claim 52, characterized in that the individual data sets are selectable additionally by said measurement sensor means.

54. An installation according to claim 52, characterized in that the individual data sets are selectable exclusively by the measurement sensor means.

55. An installation according to claim 1, characterized in that the programmable constant memory means is interchangeable.

56. An installation according to claim 1, characterized by an indicating means which indicates the respectively engaged speed corresponding to the speed memory content.

57. An installation according to claim 1, characterized in that a lower output rotational speed limit value is adapted to be stored additionally in the constant memory means for each speed, and in that on the one hand, the last-mentioned output rotational speed limit value is adapted to be inscribed into the rotational speed comparison means and, on the other hand, no shifting-up commands are produced by a selector lever program means as long as the respectively engaged speed lies above the speed range corresponding to the selector lever position.

58. An installation according to claim 1, characterized in that a forward-backward counter means is provided as speed memory means which is operable to be counted forwards by the shifting-up commands and is operable to be counted backwards by the shiftingdown commands, said speed memory means having outputs operatively connected with the electronic control unit, a selector lever program means and valve control means.

59. An installation with valves for the transmission according to claim 58, characterized in that a valve control means is provided, having input and output means, the counter position of the speed memory means and the position of the selector lever being adapted to be fed as digital input magnitudes to the valve control means, and said valve control means being operable to produce control pulses for shifting the valves of the transmission at the output means thereof in timely correct sequence.

60. An installation according to claim 1, characterized in that a speed monitoring means having a speed-determining means is provided, the input rotational speed and output rotational speed of the transmission being adapted to be fed as inputs to the speed-monitoring means, said speed-monitoring means being operable to determine from said magnitudes the respectively engaged speed and being operable to compare the same with the speed stored in a speed memory means and being operable to produce a pulse signal in case of nonagreement of the two magnitudes.

61. An installation according to claim 42, characterized in that the speed-determining means includes a forward-backward counter means which is operable to be counted forwards with the input rotational speed during a predetermined measurement period and subsequently is operable to be counted backwards with the output rotational speed, one pulse for each speed which commence with the beginning of the backward counting, being produced by the central timing generator means, the pulses having a duration coordinated to the corresponding speed, and memory means being provided, into which the content corresponding to the respectively engaged speed is adapted to be inscribed at the moment at which the last-mentioned forward-backward counter means reaches the value zero, by the then still-present pulses.

62. An installation according to claim 61, characterized in that the content corresponding to the respectively engaged speed is inscribed into the forward-backward counter means upon code conversion in a code converting means.

63. An installation according to claim 58, characterized in that a transmitter failure safety means is provided having an input, to which is fed the output rotational speed and being operable to block the inputs of the speed memory means in case of failure of the output rotational speed with a delay exceeding a predetermined value and thereby preventing a further automatic shifting of the transmission.

64. An installation for the automatic shifting of change-speed transmissions having a transmission output shaft comprising actuating means for the engagement and disengagement of the speeds, control means responsive to at least two influencing magnitudes for controlling the actuating means, the control means including an electronic control unit having a programmable constant memory means for storing at least one set of output rotational speed limit values coordinated to the individual speeds and torque steps, means for applying to respective inputs of the electronic control unit at least the influencing magnitudes of torque and engaged speed, rotational speed comparison means receiving an output of the constant memory means of the driven rotational speed limit values produced by the constant memory means for comparing with the respective output rotational speed of the transmission, the rotational speed comparison means being operable to trigger shifting-up or shifting-down signals when exceeding or falling below the limit values, and means for applying the shifting-up and shifting-down signals to the actuating means, the constant memory means further storing acceleration limit values for each speed, and acceleration comparison means receiving an output of the constant memory means of the acceleration limit values produced by the constant memory means for comparing with the prevailing acceleration of the output shaft of the transmission, the acceleration comparison means being operable to produce signals when exceeding and falling below the limit values, the signals produced by the acceleration comparison means being fed as a further influencing magnitude to the electronic control unit.

* * * * *